United States Patent
Visser et al.

(10) Patent No.: US 9,838,256 B2
(45) Date of Patent: *Dec. 5, 2017

(54) METHOD AND SYSTEM FOR REMOTE DEVICE MANAGEMENT

(71) Applicant: Koninklijke KPN N.V., The Hague (NL)

(72) Inventors: Robert Visser, Amsterdam (NL); Harm Mulder, Leiden (NL)

(73) Assignee: Koninklijke KPN N.V., The Hague (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/938,056

(22) Filed: Nov. 11, 2015

(65) Prior Publication Data

US 2016/0099837 A1    Apr. 7, 2016

Related U.S. Application Data

(63) Continuation of application No. 14/507,098, filed on Oct. 6, 2014, now Pat. No. 9,219,649, which is a
(Continued)

(30) Foreign Application Priority Data

Jul. 31, 2008  (EP) .................................. 08013735
Aug. 5, 2008   (EP) .................................. 08161850

(51) Int. Cl.
*G06F 15/177*   (2006.01)
*H04L 12/24*    (2006.01)
(Continued)

(52) U.S. Cl.
CPC ...... *H04L 41/0813* (2013.01); *H04L 41/0806* (2013.01); *H04L 41/0856* (2013.01);
(Continued)

(58) Field of Classification Search
CPC .................... H04L 29/12783; H04L 41/0806
(Continued)

(56) References Cited

U.S. PATENT DOCUMENTS 5,852,722 A    12/1998 Hamilton
6,643,690 B2   11/2003 Duursma
(Continued)

FOREIGN PATENT DOCUMENTS

EP    1940077 A1    7/2008
EP    2015179 A1    1/2009
(Continued)

OTHER PUBLICATIONS

Charles E. Perkins, "Mobile IP: Design Principles and Practices" (1998), Addison Wesley, Reading (MA), ISBN 0-201-63469-4.
(Continued)

*Primary Examiner* — Arvin Eskandarnia
(74) *Attorney, Agent, or Firm* — McDonnell Boehnen Hulbert & Berghoff LLP

(57) ABSTRACT

A system for remote device management includes in a network an auto-configuration server managing device, at least one database, and a plurality of auto-configuration servers. The auto-configuration server managing device and the database are coupled in a communicative connection. The database holds information for identification of electronic devices. The auto-configuration server managing device is arranged for communication with a manageable electronic device over the network. The auto-configuration server manager is further being arranged for:

receiving a request from the manageable electronic device for configuration data, determining an identification of the manageable electronic device by comparing the request with the information for identification of electronic devices of the database, (Continued)

determining an identification of an auto-configuration server from the plurality of auto-configuration servers in accordance with the identification of the manageable electronic device.

15 Claims, 6 Drawing Sheets

Related U.S. Application Data continuation of application No. 12/512,242, filed on Jul. 30, 2009, now Pat. No. 8,886,722.

(51) Int. Cl.
*H04L 29/08* (2006.01)
*H04L 29/12* (2006.01)

(52) U.S. Cl.
CPC ........ *H04L 67/16* (2013.01); *H04L 29/12783* (2013.01); *H04L 41/0206* (2013.01); *H04L 61/35* (2013.01)

(58) Field of Classification Search
USPC ....................................................... 709/220
See application file for complete search history.

(56) References Cited

U.S. PATENT DOCUMENTS

| | | | |
|---|---|---|---|
| 6,708,221 B1 | 3/2004 | Mendez | |
| 6,928,481 B1 | 8/2005 | Harris | |
| 7,580,367 B2 | 8/2009 | Bleckert | |
| 8,089,953 B2 * | 1/2012 | Angelot | H04L 12/66 370/351 |
| 8,233,486 B2 | 7/2012 | Phuah et al. | |
| 2002/0174247 A1 | 11/2002 | Shen | |
| 2003/0061315 A1 | 3/2003 | Jin | |
| 2007/0011301 A1 | 1/2007 | Ong et al. | |
| 2007/0171274 A1 * | 7/2007 | Yim | H04L 12/1813 348/14.08 |
| 2007/0268514 A1 | 11/2007 | Zeldin | |
| 2008/0133717 A1 * | 6/2008 | Bouchat | H04L 41/046 709/220 |
| 2008/0215668 A1 * | 9/2008 | Hu | H04L 41/0806 709/202 |
| 2009/0150977 A1 * | 6/2009 | Carley | H04L 63/08 726/3 |
| 2009/0219820 A1 * | 9/2009 | Acke | H04M 11/062 370/241 |
| 2009/0292794 A1 | 11/2009 | Ding et al. | |

FOREIGN PATENT DOCUMENTS

| | | | |
|---|---|---|---|
| EP | 2106079 A1 | 9/2009 | |
| EP | 2106079 B1 | 12/2012 | |

OTHER PUBLICATIONS

A.S. Tanenbaum, and D.J. Wetherall, "Computer Networks," 5th edition (2011), Pearson, Boston (MA), ISBN-13: 978-0-13-212695-3.

ServerWatch Tutorial, "Back to Basics: The DHCP Relay Agent" (Feb. 29, 2008) at http://www.serverwatch.com/tutorials/article.php/2193031.

Wimer, W., "Clarifications and extensions on the bootstrap protocol," RFC 1542, Internet Engineering Task Force (IETF) Standard, Oct. 1993, at http://www.ietf.org/rfc/rfc1542.txt.

"Definition of: Proxy Server," PC Magazine Encyclopedia, at http://www.pcmag.com/encyclopedia/term/49892/proxy-server, as of Jul. 29, 2014.

"Relay Channel," Wikipedia webpage, http://en.wikipedia.org/wiki/Relay_channel, 2014.

Thomas M. Cover and Abbas El Gamal, "Capacity theorems for the relay channel," IEEE Transactions on Information Theory (1979), pp. 572-584.

Kitamura, H., "A Socks-based IPv6/IPv4 Gateway Mechanism," RFC 3089, Internet Engineering Task Force (IETF) Standard, Apr. 2001, at http://www.ietf.org/rfc/rfc3089.txt.

"Application layer gateways and protocol translation," IBM Knowledge Center, at http://www 01.ibm.com/support/knowledgecenter/SSLTBW_2.1.0/com.ibm.zos.v2r1.hale001/ipv6d0021034306.htm as of Jul. 29, 2014.

"IP Details," Manual for Olicom CrossFire 8720 Fast Ethernet Switch (1999), at http://www.lard.net/olicom/CD_1.05/Help%20files/ipdetail.html, as of Jul. 29, 2014.

"SMTP Relay vs. forwarding," Oracle Community forum website Jan. 14, 2005, at http://www.lard.net/olicom/CD_1.05/Help%20files/ipdetail.html.

"CPE WAN Management Protocol," TR-069 amendment Jul. 4, 2011, at http://www.lard.net/olicom/CD_1.05/Help%20files/ipdetail.html.

Valcourt, Scott A., "DSL-From A to V and Back Again (Invited Paper)", Access Networks & Workshops, 2007, Accessnets '07, Second International Conference on, IEEE, PI, Aug. 1, 2007, pp. 1-5.

DSLHome-Technical Working Group, "CPE WAN Management Protocol", Internet Citation, [Online], XP002316355, retrieved from the Internet: URL:http//www.dslforum.org/aboutdsl/Technical_Reports/TR-069.pdf, Chapter 3.1, retrieved on Feb. 4, 2005, pp. 91-109.

The DSL Home Technical Working Group in DSL Forum, TR-069 Amendment 1, the CPE WAN Management Protocol (Nov. 2006).

"Digital cellular telecommunications system (Phase 2+); General Packet Radio Services (GPRS); Service description; Stage 2," ETSI GSM 03.60 version 7.4.1 Release 1998.

"Portable Profiles for Residential Gateways," Mario Ibanez, Juan J. Sanchez, Natividad Martinez, and Ralf Seepold, 2006 International Workshop on Intelligent Solutions in Embedded Systems, IEEE, Jun. 30, 2006.

GPRS General Packet Radio Service, Regis Bates, McGraw-Hill, 2002.

\* cited by examiner

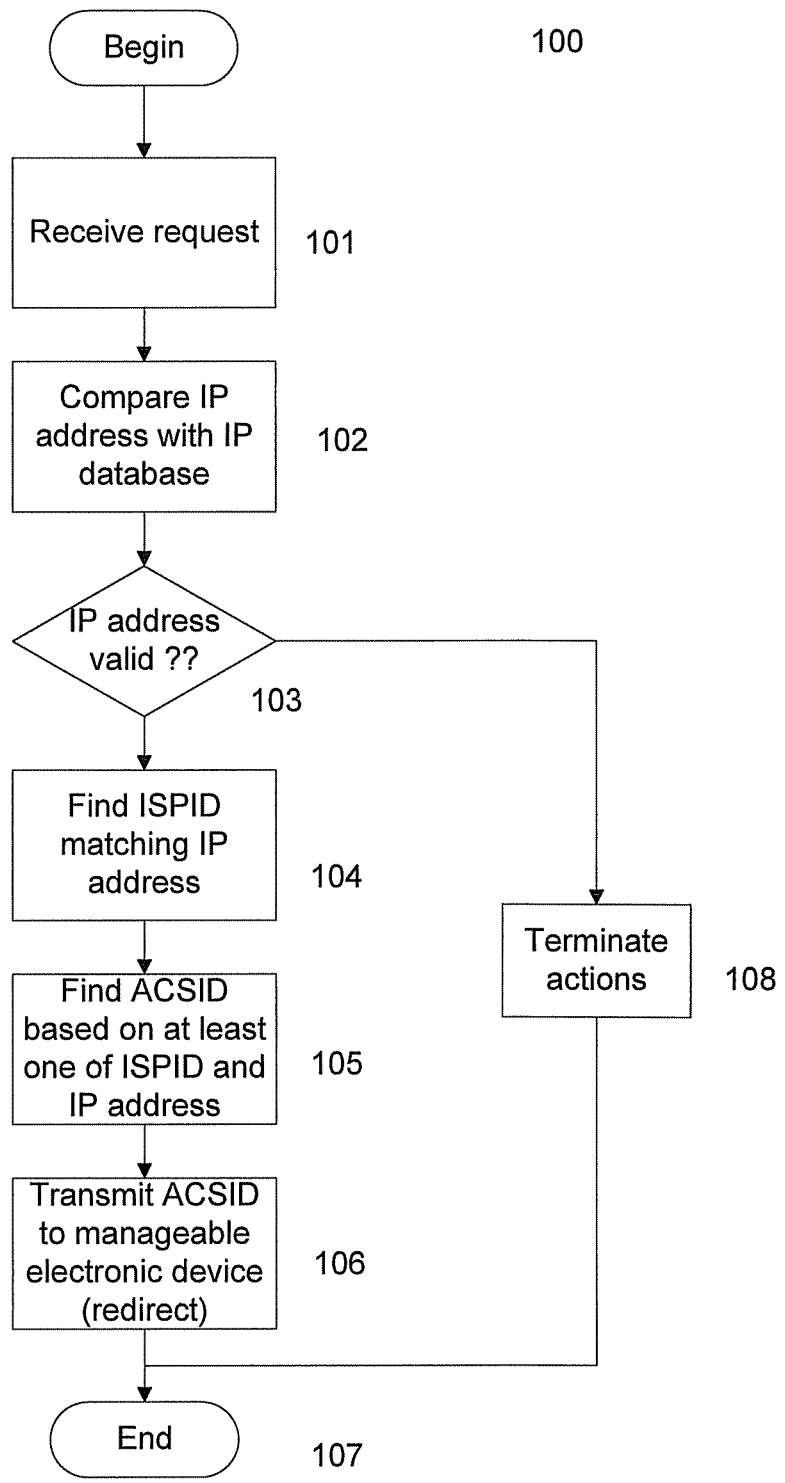

METHOD AND SYSTEM FOR REMOTE DEVICE MANAGEMENT

CROSS REFERENCE TO RELATED APPLICATIONS

The present application is a continuation of, and claims priority to U.S. application Ser. No. 14/507,098, filed on Oct. 6, 2014, which claims priority to U.S. application Ser. No. 12/512,242, filed on Jul. 30, 2009, which claims priority to both EP 08013735.9, filed in the European Patent Office on Jul. 31, 2008, and EP 08161850.6, filed in the European Patent Office on Aug. 5, 2008, all four of which are hereby incorporated in their entirety herein by reference.

FIELD OF THE INVENTION

The present invention relates to a method for remote device management. Also, the present invention relates to a system for remote device management.

BACKGROUND OF THE INVENTION

Digital communication is well established by virtue of the Internet protocol (IP) that allows an electronic device to communicate to other electronic devices over a potentially world-wide network.

In such a network, the electronic device (often referred to as Customer Premises equipment, CPE) is typically coupled to the wide area network (WAN) (e.g., over digital subscriber line DSL), either directly or via a local area network (LAN).

CPE may be any type of electronic device capable of digital communication. For example, it may be a personal computer, a gateway or router, an electronic appliance such as a set-top box, a television set, an IP based telephone, etc.

Many CPE devices allow remote management over the wide area network, which relates to auto-configuration and dynamic service provisioning, software management, status and performance monitoring and diagnostics. The DSL Home-Technical Working Group describes in *DSL Forum, TR-069 amendment 1, the CPE WAN management protocol* (November 2006), an end-to-end architecture for remote device management. (Recently, DSL-Forum has been renamed to BroadBand-Forum). In this architecture, a CPE device in a local network connects to an auto-configuration server (ACS) that is capable of providing service level settings for services available to the CPE.

Typically, the ACS is dedicated either to a certain level of services (e.g. premium, best effort), a type of device (e.g. Home Gateway, Voice over IP telephone, Set TopBox) or a specific customer group (e.g. business or residential). For that reason, it is adversely required that each CPE must be preconfigured before installation at the location of the customer to specifically address the proper ACS in dependence of the combination of options above available to the customer. To address the proper ACS, it will be required to pre-program the CPE with either a specific IP address or a specific URL (uniform resource locator) for the dedicated ACS. Alternatively to pre-configuration of the CPE, configuration of the CPE may be done during installation either by service personnel or by the customer, but this may be time-consuming and/or may be sensitive to errors and mistakes.

SUMMARY OF THE INVENTION

It is an object of the present invention to provide a method that overcomes or reduces the problems of the prior art.

According to an aspect of the invention, there is provided a system for remote device management comprising in a network an auto-configuration server managing device, at least one database, and a plurality of auto-configuration servers; the auto-configuration server managing device and the at least one database being coupled in a communicative connection; the at least one database being arranged for holding information for identification of electronic devices; the auto-configuration server managing device being arranged for communication with a manageable electronic device over the network, the manageable electronic device capable of sending a request for configuration data, the auto-configuration server manager further being arranged for:

receiving the request from the manageable electronic device for configuration data, determining an identification of the manageable electronic device by comparing the request with the information for identification of electronic devices of the at least one database, determining an auto-configuration server from the plurality of auto-configuration servers in accordance with the identification of the manageable electronic device.

Advantageously, the method allows to configure any type of manageable electronic device at any given location and within any level of service or group specification without pre-configuring a dedicated address for configuration. The method will determine which specific auto-configuration server (ACS) is available for a given manageable electronic device, which allows to reduce the complexity of pre-installation and installation of devices. Also, the method allows a simpler manner to set up dedicated auto-configuration servers, since the addresses of the auto-configuration servers only need to be maintained in a central database.

Also, the method allows a separation of access networks and the services provider via the possibility of rerouting as defined in the invention.

According to an aspect of the invention, there is provided a method for remote device management of a manageable electronic device in a network, the network comprising an auto-configuration server managing device, at least one database, and a plurality of auto-configuration servers; the auto-configuration server managing device and the at least one database being coupled in a communicative connection; the at least one database being arranged for holding information for identification of electronic devices; the auto-configuration server managing device being arranged for communication with the manageable electronic device over the network, the manageable electronic device capable of sending a request for configuration data, wherein the method comprises:

receiving the request;

determining an identification of the manageable electronic device using a comparison of the request with the information for identification of electronic devices of the at least one database, determining an identification of an auto-configuration server from the plurality of auto-configuration servers in accordance with the identification of the manageable electronic device.

Furthermore, the present invention relates to a computer system for remote device management, the computer comprising a processing unit and memory, the memory being connected to the processing unit, the computer being arranged in a network, the network comprising at least one database, and a plurality of auto-configuration servers; the computer and the at least one database being coupled in a communicative connection; the at least one database being arranged for holding information for identification of electronic devices; wherein the computer is arranged for communication with a manageable electronic device over the network and for
- receiving a request from the manageable electronic device for configuration data,
- determining an identification of the manageable electronic device by comparing the request with the information for identification of electronic devices of the at least one database,
- determining an identification of an auto-configuration server from the plurality of auto-configuration servers in accordance with the identification of the manageable electronic device.

Additionally, the present invention relates to a computer program on a computer-readable medium to be loaded by a computer, the computer comprising a processing unit and memory, the processing unit being connected to the memory; the computer being arranged in a network, the network comprising at least one database, and a plurality of auto-configuration servers; the computer and the at least one database being coupled in a communicative connection; the at least one database being arranged for holding information for identification of electronic devices; wherein the computer is arranged for communication with a manageable electronic device over the network, the manageable electronic device capable of sending a request for configuration data, and wherein the computer program product after being loaded allows the processing unit to carry out:
- receiving the request from the manageable electronic device for configuration data,
- determining an identification of the manageable electronic device by comparing the request with the information for identification of electronic devices of the at least one database,
- determining an identification of an auto-configuration server from the plurality of auto-configuration servers in accordance with the identification of the manageable electronic device.

BRIEF DESCRIPTION OF DRAWINGS

Embodiments will now be described, by way of example only, with reference to the accompanying schematic drawings in which corresponding reference symbols indicate corresponding parts, and in which:

FIG. 3a, 3b show a flow diagram in accordance with a respective embodiment of a method of the present invention;

DETAILED DESCRIPTION OF EMBODIMENTS

Figure 1:
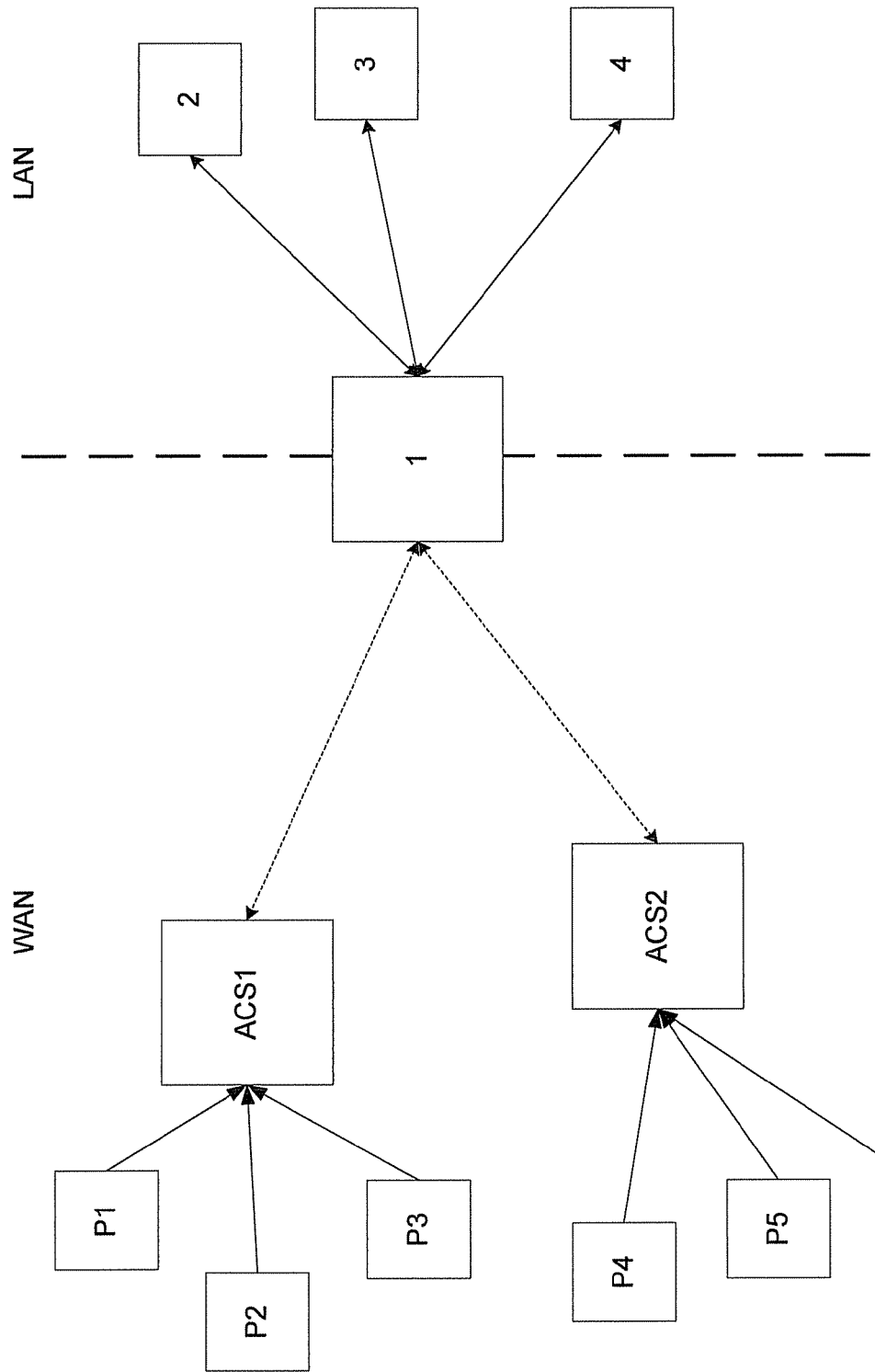
FIG. 1 schematically shows an end-to-end architecture for remote device management from the prior art.

FIG. 1 schematically shows an end-to-end architecture for remote device management from the prior art.

The end-to-end architecture relates to a network arrangement for remote device management. A local area network LAN is coupled to a wide area network WAN through an interfacing device 1 which is typically a manageable electronic device. The local network LAN may comprises one or more electronic devices 2, 3, 4 which are in a communicative connection with the interfacing device 1. One or more of the electronic devices 2, 3, 4 may also be a manageable electronic device.

The local area network LAN may be a home network or an office network, i.e., a network located at a specific geographic location. Also, the local area network LAN may be a logical network which is distributed over a number of geographic locations.

The wide area network WAN provides connectivity to a plurality of interfacing devices in a wide area. For example, the wide area network is the global network arrangement known as the Internet.

In the local area network LAN and the wide area network WAN, electronic devices are arranged to have an address for identification on the respective network (i.e., communication is address based). A well known address scheme is the Internet Protocol address system that provides a so-called IP address to each electronic device coupled to the network. The methods for an electronic device to obtain an IP address for identification are known in the art.

Coupled to the wide area network are at least a first auto-configuration server ACS1, which comprises configuration data for a particular manageable electronic device, for example, the interfacing device 1 in the local area network LAN. A second auto-configuration server ACS2 is shown which comprises configuration data for another particular manageable electronic device, for example the manageable electronic device 2 in the local area network LAN.

Configuration data for the auto-configuration server ACS1 or ACS2 is delivered from some provisioning systems (P1, P2, P3; P4, P5, P6), which may relate to equipment specific, service level specific and/or customer specific configuration data.

Both the first and second auto-configuration servers ACS1, ACS2 connect over the wide area network WAN to the local area network LAN (schematically shown by a respective dashed arrow-line) through the interfacing device 1, which may be a so-called router.

In the method from the prior art, a manageable electronic device requires configuration data from a dedicated auto-configuration server, for example, as an initialization of the level of service available to the manageable electronic device after installation or as an update during operation. In that event the manageable electronic device needs to request configuration data from the specific auto-configuration server dedicated to the level of service or to the type of the manageable electronic device. As a consequence a specific (IP) address or URL must be 'known' to the manageable electronic device before contacting the auto-configuration server. The request will be handled in a well-known manner. The manageable electronic device sends a request to the address of the auto-configuration server. The auto-configuration server sends a reply to the manageable electronic device, in which the reply contains the requested data. In this case, the specific address or URL must be pre-configured for the device before installation at the local area network, which may depend on one or more parameters chosen from at least the level of service; the type of the device; the type of access network and/or a customer specific parameter. As a result, pre-configuration can be complex.

Figure 2:
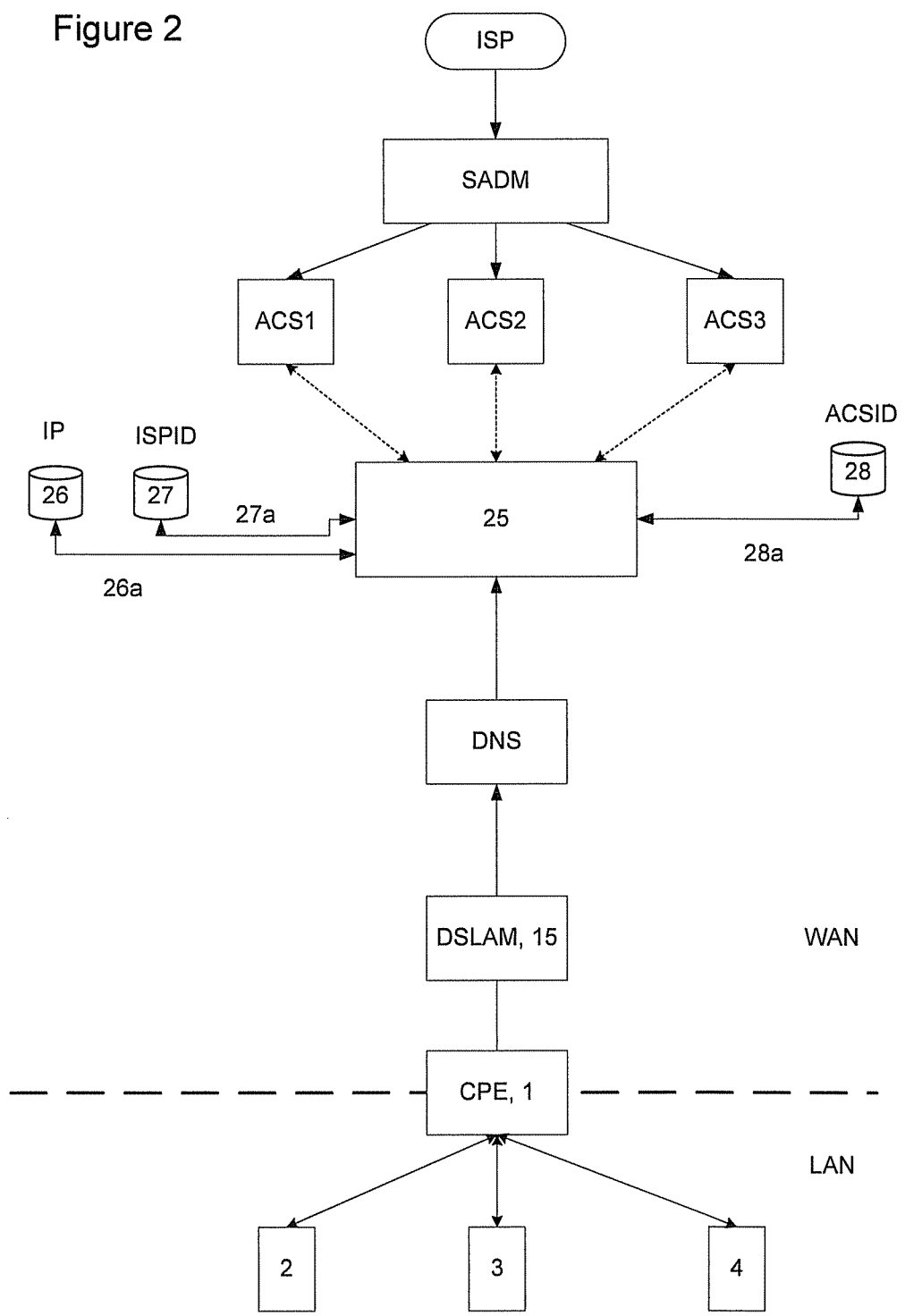
FIG. 2 schematically shows an architecture for remote device management in accordance with an embodiment.

FIG. 2 schematically shows an architecture for remote device management in accordance with an embodiment.

In FIG. 2 entities with the same reference number as shown in the preceding figure refer to corresponding entities.

Within the wide area network WAN, the architecture comprises a DSL access multiplexer (DSLAM), a domain name server DNS, an auto-configuration server manager 25, databases 26, 27, 28, a plurality of auto-configuration servers ACS1, ACS2, ACS3.

The DSL access multiplexer (DSLAM) is communicatively coupled to the domain name server DNS. The domain name server DNS is communicatively coupled to the auto-configuration server manager 25.

The auto-configuration server manager 25 is arranged for controlling access to the auto-configuration servers ACS1, ACS2, ACS3 as is indicated by the dotted lines. an embodiment of the auto-configuration server manager 25 is described below with reference to FIG. 6. The access control function (of the auto-configuration server manager 25) will be described below in more detail.

The auto-configuration server manager 25 is communicatively coupled to databases 26, 27, 28 for receiving information signals 26A, 27A, 28A. The databases may be located in one or more database servers, which may be located remotely from one another, as is known to persons skilled in the Art. The databases 26, 27, 28 and information signals 26A, 27A, 28A will be described below in more detail.

In an embodiment, the architecture further comprises a SADM (Service Activation Device Manager) which provides an interface to service providers such as ISP, CPE manufacturers for accessing the auto-configuration servers ACS1, ACS2, ACS3 in a uniform manner.

The interfacing device 1, such as a router, connects the local area network LAN to the wide area network WAN over a connection device 15. In many occasions, the connection will be implemented using digital subscriber line (DSL) technology, but in the present invention other alternative signal carriers capable of IP based communication such as optical fiber (e.g., fiber to the home, fiber to the curb), cable TV network(s), powerline or radio loops (e.g. UMTS) are considered applicable. In case of DSL technology, the interfacing device 1 is coupled to the DSL access multiplexer (DSLAM), which establishes a connection between the interfacing device 1 (and the local network LAN) and a WAN network switch (not shown).

In the wide area network WAN the domain name server DNS is arranged for resolving domain name requests from the (manageable) electronic devices in the local network LAN (or any electronic device in the wide area network).

FIG. 3a shows a flow diagram 100 in accordance with an embodiment of a method of the present invention.

A manageable electronic device in the local area network LAN requires configuration data from a dedicated auto-configuration server, for example the interfacing device 1 requires configuration data for auto-configuration server ACS1.

In the present invention an (IP) address or URL is provided in a memory of the manageable electronic device 1 as default address for the auto-configuration server ACS1, which default (IP) address or URL actually points to the auto-configuration server manager 25.

The requesting manageable electronic device 1 sends its request to the wide area network WAN. In case the request comprises the IP address of the auto-configuration server manager, the DSLAM transmits the request to the network switch (not shown) that will relay the request to the auto-configuration server manager (as known in the art). In the alternative case that the request comprises an URL, the DSLAM transmits the request to the domain name server DNS which resolves the address of the request into an IP address. Based on the IP address the request can be relayed by the network switch. Alternatively, the in IRNA (Internet Assigned Numbers Authority) defined port for device management applications may be used to intercept the request independent of the IP address the request is issued on.

In a first action 101, the auto-configuration server manager receives the request from the manageable electronic device 1. Typically, the request comprises the IP address of the manageable electronic device 1 and information on the type or function of the manageable electronic device 1. Optionally, the request may comprise information on the manufacturer or supplier of the manageable electronic device.

In a second action 102, the auto-configuration server manager 25 compares the received IP address of the manageable electronic device with a first database 26 (or IP address database) that comprises IP address information on IP addresses that are valid for allowing access to (the service of) the auto-configuration server manager 25. It can either do this directly or via a set of additional translations using the identification of the access line (or SIM card in case of wireless access), for linking a communication line to a customer.

Next, in action 103, the auto-configuration server manager 25 checks (indicated by information signal 26A) if the received IP address is a valid address in the first database 26. If the match is successful, the method continues in action 104, else the method continues in action 108, that terminates the method.

In action 108, the auto-configuration server manager 25 may optionally transmit a message to the requesting manageable electronic device that no server is available. After action 108, the method ends in action 107.

In action 104, the auto-configuration server manager 25 resolves (by information signal 27A) an identity of the service provider ISPID from the IP address by means of a second database 27 which comprises information that associates the identity of the service provider ISPID with the IP address of the manageable electronic device.

In a next action 105, the auto-configuration server manager 25 resolves (by information signal 28A) an IP address ACSID of the dedicated auto-configuration server from at least one of the identity of the service provider ISPID and the received IP address of the manageable electronic device 1 by means of a third database 28 which comprises information that associates the IP address of the dedicated auto-configuration server with at least one of the identity of the service provider ISPID and the IP address of the manageable electronic device. Advantageously, as a function of at least one of the identity of the service provider ISPID and the IP address of the manageable electronic device the auto-configuration server manager 25 is capable of selecting an identity ACSID for the dedicated auto-configuration server in relation to a pre-determined level of service. Typically, the identity ACSID comprises an IP address or an URL for the respective auto-configuration server ACS1; ACS2; ACS3.

Then in a further action 106, the auto-configuration server manager 25 transmits the identity ACSID of the dedicated auto-configuration server to the manageable electronic device 1 that made the request. For example, the transmission may use a redirection mechanism which comprises instructions for the manageable electronic device 1 to re-transmit the request to the dedicated auto-configuration server identified by ACSID. In an embodiment, the redirection mechanism is based on the HyperText Transfer Protocol (HTTP) redirect function.

In action 107, the method ends.

Figure 3B:
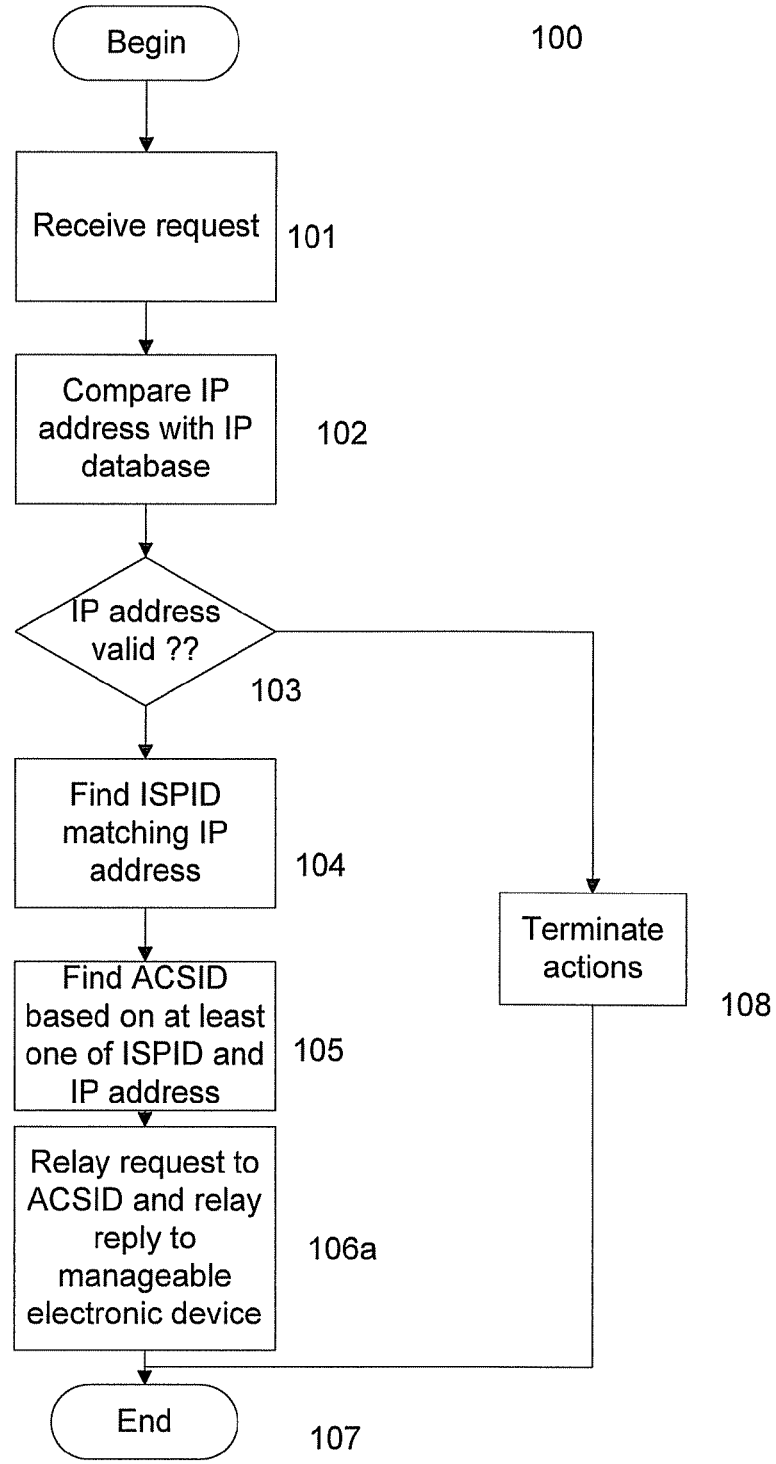

In an alternative embodiment, shown in FIG. 3b, an alternative action 106a (as alternative to action 106) provides that the auto-configuration server manager 25 functions as an intermediate and relays the request from the requesting manageable electronic device 1 to the dedicated auto-configuration server as identified by ACSID, receives the reply from the dedicated auto-configuration server and transmits that reply to the manageable electronic device 1.

The information of the first, second and third databases 26, 27, 28 may be provided by a service provider of the DSL network and/or DSLAM.

Figure 4:
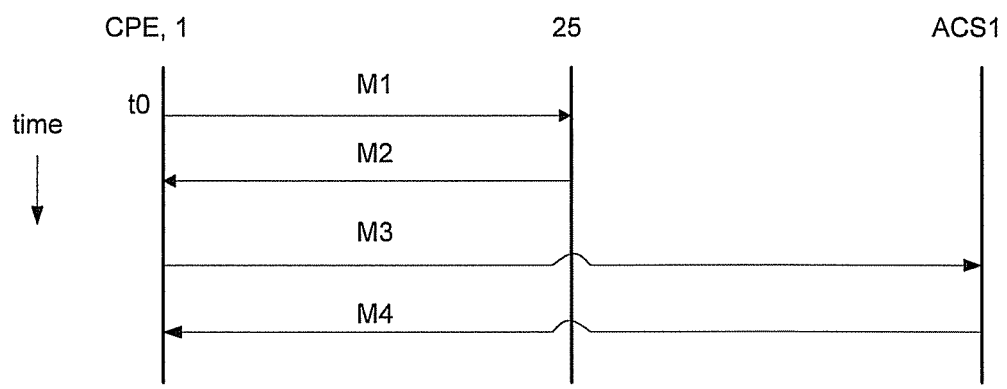
FIG. 4 schematically shows a signal flow in accordance with an embodiment.

FIG. 4 schematically shows a signal flow in accordance with an embodiment.

In FIG. 4 the manageable electronic device is represented by a line CPE, the auto-configuration server manager 25 by a second line AM and the dedicated auto-configuration server by a third line ACS1. Time t is represented in the downward direction.

At a time t0, the manageable electronic device CPE; 1 sends a first message M1 to the default IP address or URL provided in the memory of the manageable electronic device 1 as address for a dedicated auto-configuration server, which default (IP) address or URL points to the auto-configuration server manager 25. The first message comprises the request for configuration data from the dedicated auto-configuration server. Further the first message M1 comprises at least the IP address (or URL) of the manageable electronic device as identification on the wide area network WAN, an identification of the type or function of the manageable electronic device and optionally additional identification, for example the identity of the supplier/manufacturer of the device.

The first message M1 is received by the auto-configuration server manager 25. The auto-configuration server manager 25 carries out the actions 101-107 of the method as described above with reference to FIG. 3, and sends a second message M2 to the manageable electronic device CPE; 1.

The second message M2 comprises the reply which may be negative (after action 108) or confirmative (after action 106). In case the second message M2 is confirmative, the second message M2 comprises an IP address or URL for the dedicated auto-configuration server identified by ACSID.

Next, the manageable electronic device CPE; 1 re-transmits a third message M3 to the IP address or URL associated with the dedicated auto-configuration server ACS1 identified by ACSID. The third message M3 comprises at least the request for configuration data from the dedicated auto-configuration server identified by ACSID.

The dedicated auto-configuration server ACS1 receives the third message M3 and transmits in response a fourth message M4 to the manageable electronic device CPE; 1. The fourth message M4 comprises the configuration data requested by the manageable electronic device. The manageable electronic device receives the fourth message and uses the configuration data within the fourth message for any configuration purposes as described above.

Figure 5:
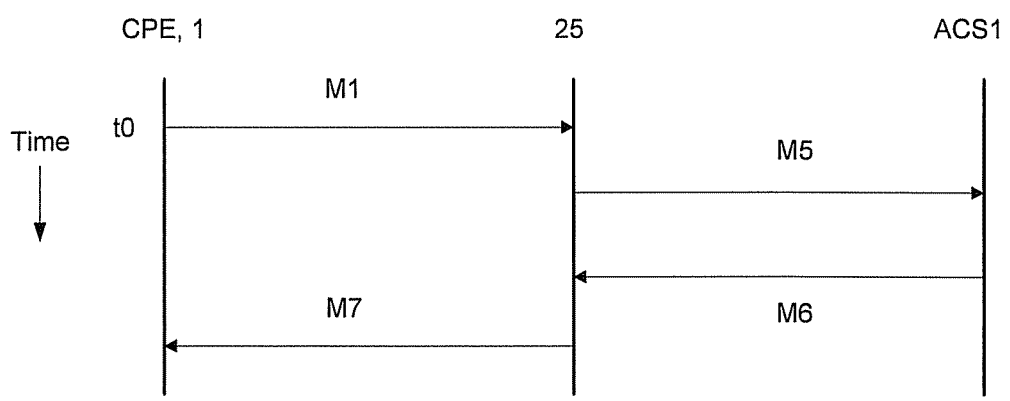
FIG. 5 shows a further signal flow in accordance with an embodiment.

FIG. 5 shows a further signal flow in accordance with an alternative embodiment.

In FIG. 5 the manageable electronic device is represented by a line CPE, the auto-configuration server manager 25 by a second line AM and the dedicated auto-configuration server by a third line ACS1. Time t is represented in the downward direction.

At a time t0, the manageable electronic device CPE; 1 sends a first message M1 to the default IP address or URL provided in the memory of the manageable electronic device 1 as address for a dedicated auto-configuration server, which (IP) address or URL points to the auto-configuration server manager 25. The first message comprises a request for configuration data from the dedicated auto-configuration server. Further the first message M1 comprises at least the IP address (or URL) of the manageable electronic device as identification on the wide area network, an identification of the type or function of the manageable electronic device and optionally additional identification, for example the identity of the supplier/manufacturer of the device.

The first message M1 is received by the auto-configuration server manager 25. The auto-configuration server manager 25 carries out the actions 101-105 of the method as described above to identify the dedicated auto-configuration server and subsequently the alternative action 106a, in which the auto-configuration server manager 25 functions as an intermediate and relays a first relayed message M5 to the dedicated auto-configuration server as identified by ACSID if the first message M1 contains a valid request. The first relayed message M5 comprises at least the request from the requesting manageable electronic device 1.

It is noted that if the first message M1 contains an invalid request, the auto-configuration server manager 25 may transmit a negative reply to the manageable electronic device in a similar manner as described with reference to FIG. 3a and cancels further execution of the actions of the method.

Next, the dedicated auto-configuration server ACS1 identified by ACSID receives the first relayed message M5. In response, the dedicated auto-configuration server ACS1 transmits a reply M6 to the first relayed message to the auto-configuration server manager 25.

The reply M6 to the first relayed message M5 comprises the configuration data requested by the manageable electronic device.

The auto-configuration server manager 25 receives the reply from the dedicated auto-configuration server ACS1 and relays that reply M6 to the manageable electronic device 1 as a second relayed message M7.

The second relayed message M7 comprises the configuration data requested by the manageable electronic device. The manageable electronic device receives the second relayed message and uses the configuration data within the second relayed message for any configuration purposes as described above.

It is noted that in a similar manner as described here for the interfacing device 1, a manageable electronic device 2; 3; 4 residing in the local network LAN can be provided with configuration data. The person skilled in the art will appreciate that any manageable electronic device residing the local network LAN can have access to any electronic device in the wide area network WAN through interfacing device 1, for example through the concept of network address translation (NAT).

Figure 6:
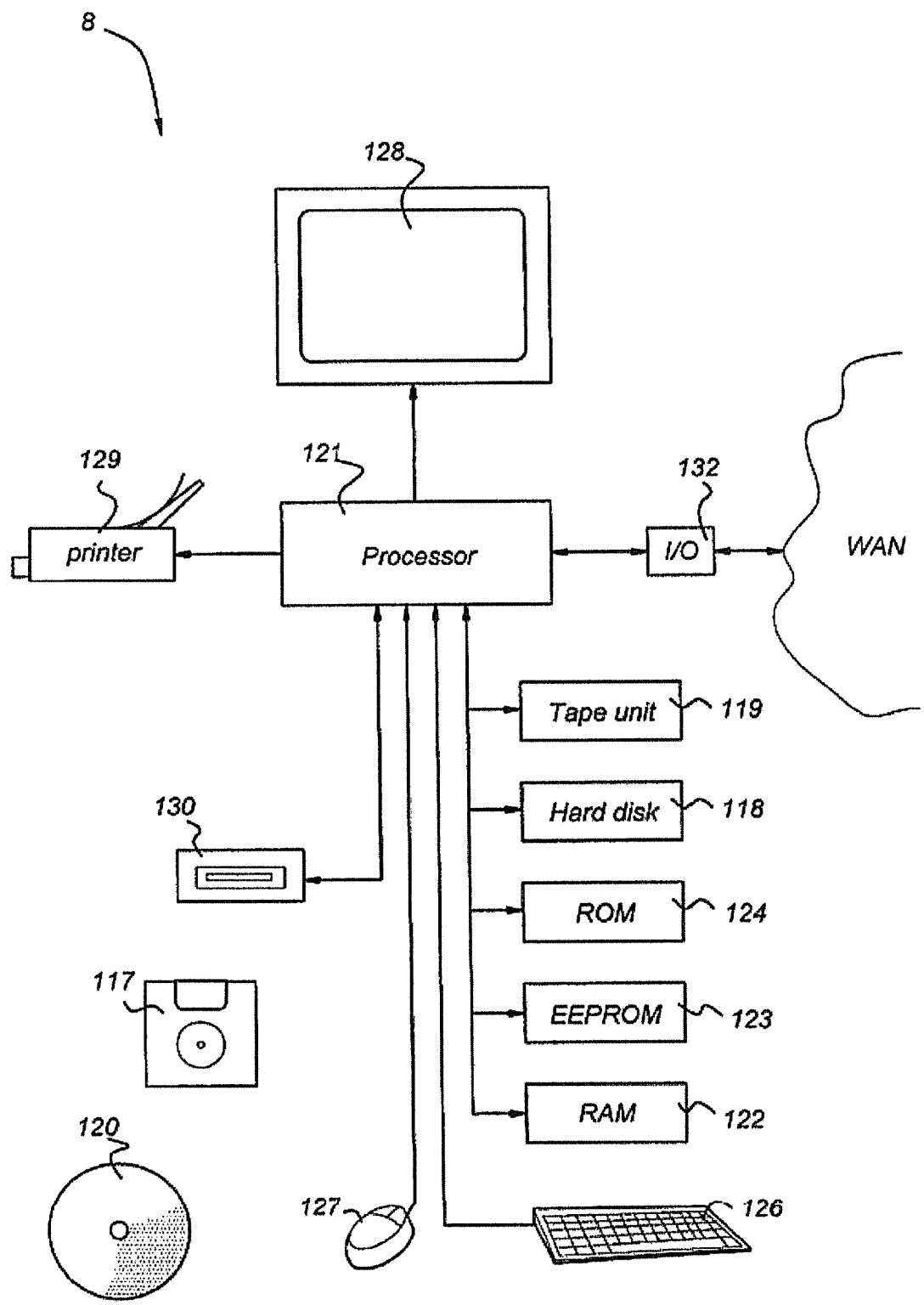
FIG. 6 shows an auto-configuration server manager in an embodiment of the invention.

FIG. 6 shows an auto-configuration server manager in an embodiment of the invention.

The auto-configuration server manager 25 may be implemented as a computer system 8. The computer system 8 comprises host processor 121 with peripherals. The host processor 121 is connected to memory units 118, 119, 122, 123, 124 which are arranged for storing instructions and data, one or more reading units 130 (to read, e.g., floppy disks 117, CD ROM's 120, DVD's, portable memory card devices, etc.), a keyboard 126 and a mouse 127 as input devices, and as output devices, a monitor 128 and a printer 129. Other input devices as well as other output devices may be provided.

Further, a network I/O device 132 is provided for a connection to the network WAN. Other components of the computer system may be arranged on the network WAN.

The memory units shown comprise RAM 122, (E)EPROM 123, ROM 124, tape unit 119, and hard disk 118. However, it should be understood that there may be provided more and/or other memory units known to persons skilled in the art. Moreover, one or more of them may be physically located remote from the processor 121, if required.

The host processor 121 is shown as one box, however, it may comprise several processing units functioning in parallel or controlled by one main processor, that may be located remotely from one another, possibly distributed over the wide area network WAN, as is known to persons skilled in the art.

The host processor 121 comprises functionality either in hardware or software components to carry out respective functions for the implementation of the method of the present invention.

Skilled persons will appreciate that the functionality of the present invention may be accomplished by a combination of hardware and software components. Hardware components, either analogue or digital, may be present within the host processor 121 or may be present as separate circuits which are interfaced with the host processor 121. Further it will be appreciated by persons skilled in the art that software components that are executable by the host processor may be present in a memory region of the host processor 121.

The computer system 8 shown in FIG. 6 is arranged for performing computations in accordance with the method of the present invention. The present invention relates also to a computer program on a computer readable medium, which computer program implements the method of the present invention. The computer system 8 is capable of executing the computer program (or corresponding program code or instructions) to carry out the method of the present invention after loading the computer program from the computer readable medium into the computer system.

It is noted that the present invention is not limited to providing configuration data to a manageable electronic device for a certain level of service, but the present invention may also be used for support provided by manufacturers of electronic equipment over the wide area network. For example, the present invention may be used as a service for networkable consumer electronics to provide software upgrades or diagnostics through a default configuration address (that may be valid in any location of the global Internet). In this case the request in the first message M1 additionally comprises an identification of the supplier and/or an identification of the type of product. In this embodiment, the auto-configuration server manager 25 is capable to determine the auto-configuration server associated with the manageable electronic device based on at least one of the identification of the supplier and the identification of the type of product.

It will be apparent to the person skilled in the art that other alternative and equivalent embodiments of the invention can be conceived and reduced to practice without departing from the spirit of the invention, the scope of the invention being limited only by the appended claims.

The invention claimed is:

1. A system for remote device management in a network comprising:
    an auto-configuration server managing device;
    at least one database arranged for holding information for identification of electronic devices; and
    a plurality of auto-configuration servers,
    wherein the auto-configuration server managing device and the at least one database are coupled in a communicative connection,
    wherein the auto-configuration server managing device is arranged for communication with a manageable electronic device over the network, the manageable electronic device configured for sending a request for configuration data,
    and the auto-configuration server manager further being arranged for:
        receiving the request from the manageable electronic device for configuration data,
        determining an identification of the manageable electronic device by comparing the request with the information for identification of electronic devices of the at least one database,
        determining an identification of an auto-configuration server from the plurality of auto-configuration servers in accordance with the identification of the manageable electronic device, and
        relaying the request to the identified auto-configuration server.

2. The system according to claim 1, wherein the auto-configuration server managing device is further arranged for receiving a reply from the identified auto-configuration server and relaying the reply to the manageable electronic device.

3. The system according to claim 1, wherein the auto-configuration server managing device is further arranged for identifying the type of manageable electronic device by comparing a network address of the manageable electronic device in the request with a predetermined plurality of network addresses in the at least one database.

4. The system according to claim 3, wherein identifying the type of the manageable electronic device further comprises identifying a service provider based on the network address from a predetermined plurality of service provider identifications associated with the predetermined plurality of network addresses in the at least one database.

5. The system according to claim 4, wherein determining an identification of an auto-configuration server from the plurality of auto-configuration servers in accordance with the identification of the manageable electronic device further comprises determining a network address of the identified auto-configuration server from a predetermined plurality of auto-configuration server network addresses in the at least one database.

6. The system according to claim 3, wherein determining an identification of an auto-configuration server from the plurality of auto-configuration servers in accordance with the identification of the manageable electronic device further comprises determining a network address of the identified auto-configuration server from a predetermined plurality of auto-configuration server network addresses in the at least one database.

7. The system according to claim 1, wherein the manageable electronic device is an interfacing device for coupling a local area network into communicative communication with the network.

8. The system according to claim 1, wherein the manageable electronic device is localized at a local area network, the local area network being coupled to the network over a signal carrier selected from a group consisting of digital subscriber line, Fiber-to-the-curb, Fiber-to-the-home, cable TV network, Powerline, and wireless transmission.

9. The system according to claim 1, further comprising an interface to service providers for accessing the auto-configuration server in a uniform manner.

10. A computer device for remote device management, the computer device being arranged in a network, the network comprising at least one database and a plurality of auto-configuration servers, wherein the computer device and the at least one database are coupled in a communicative connection, and the at least one database is arranged for holding information for identification of electronic devices, the computer device comprising:
  a processing unit and memory, the memory being connected to the processing unit;
  and instructions stored in the memory that when executed by the processing unit cause the computer device to carry operations including:
  receiving a request from a manageable electronic device for configuration data, the computer device being arranged for communication with the manageable electronic device over the network,
  determining an identification of the manageable electronic device by comparing the request with the information for identification of electronic devices of the at least one database,
  determining an identification of an auto-configuration server from the plurality of auto-configuration servers in accordance with the identification of the manageable electronic device, and
  relaying the request to the identified auto-configuration server.

11. The computer device according to claim 10, wherein the instructions stored in the memory that when executed by the processing unit cause the computer device to carry operations further include
  receiving a reply from the identified auto-configuration server, and
  relaying the reply to the manageable electronic device.

12. A non-transitory computer-readable medium having instructions stored thereon that, when executed by a processing unit of a computer device arranged in a network comprising at least one database and a plurality of auto-configuration servers, cause the computer device to carry out operations, wherein the computer device and the at least one database are coupled in a communicative connection, and the at least one database is arranged for holding information for identification of electronic devices, and wherein the operations include:
  receiving a request from a manageable electronic device for configuration data, wherein the computer device is arranged for communication with the manageable electronic device over the network;
  determining an identification of the manageable electronic device by comparing the request with the information for identification of electronic devices of the at least one database,
  determining an identification of an auto-configuration server from the plurality of auto-configuration servers in accordance with the identification of the manageable electronic device; and
  relaying the request to the identified auto-configuration server.

13. The non-transitory computer-readable medium according to claim 12, wherein the operations further include
  receiving a reply from the identified auto-configuration server, and
  relaying the reply to the manageable electronic device.

14. A method for remote device management of a manageable electronic device in a network, the network comprising an auto-configuration server managing device, at least one database, and a plurality of auto-configuration servers, wherein the auto-configuration server managing device and the at least one database are coupled in a communicative connection, and the at least one database is arranged for holding information for identification of electronic devices, and wherein the auto-configuration server managing device is arranged for communication with the manageable electronic device over the network, and the manageable electronic device configured for sending a request for configuration data, the method comprising:
  receiving the request;
  determining an identification of the manageable electronic device using a comparison of the request with the information for identification of electronic devices of the at least one database;
  determining an identification of an auto-configuration server from the plurality of auto-configuration servers in accordance with the identification of the manageable electronic device; and
  relaying the request to the identified auto-configuration server.

15. The method according to claim 14, further comprising the steps of
  the auto-configuration server managing device receiving a reply from the identified auto-configuration server and relaying the reply to the manageable electronic device.

* * * * *